2,772,534
FRUIT PICKER HAVING A PLURALITY OF PIVOTED KNIFE CARRYING FINGERS

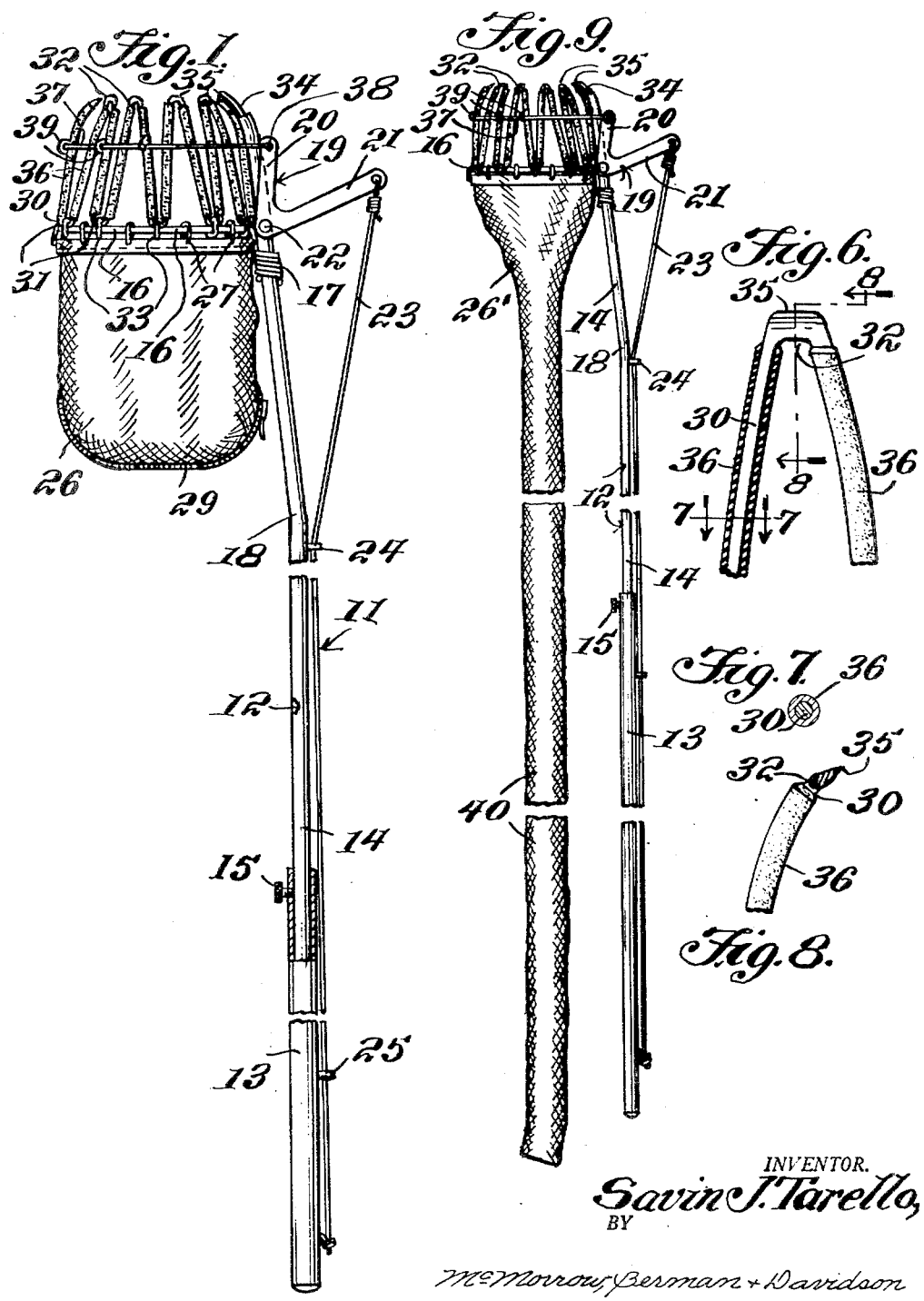

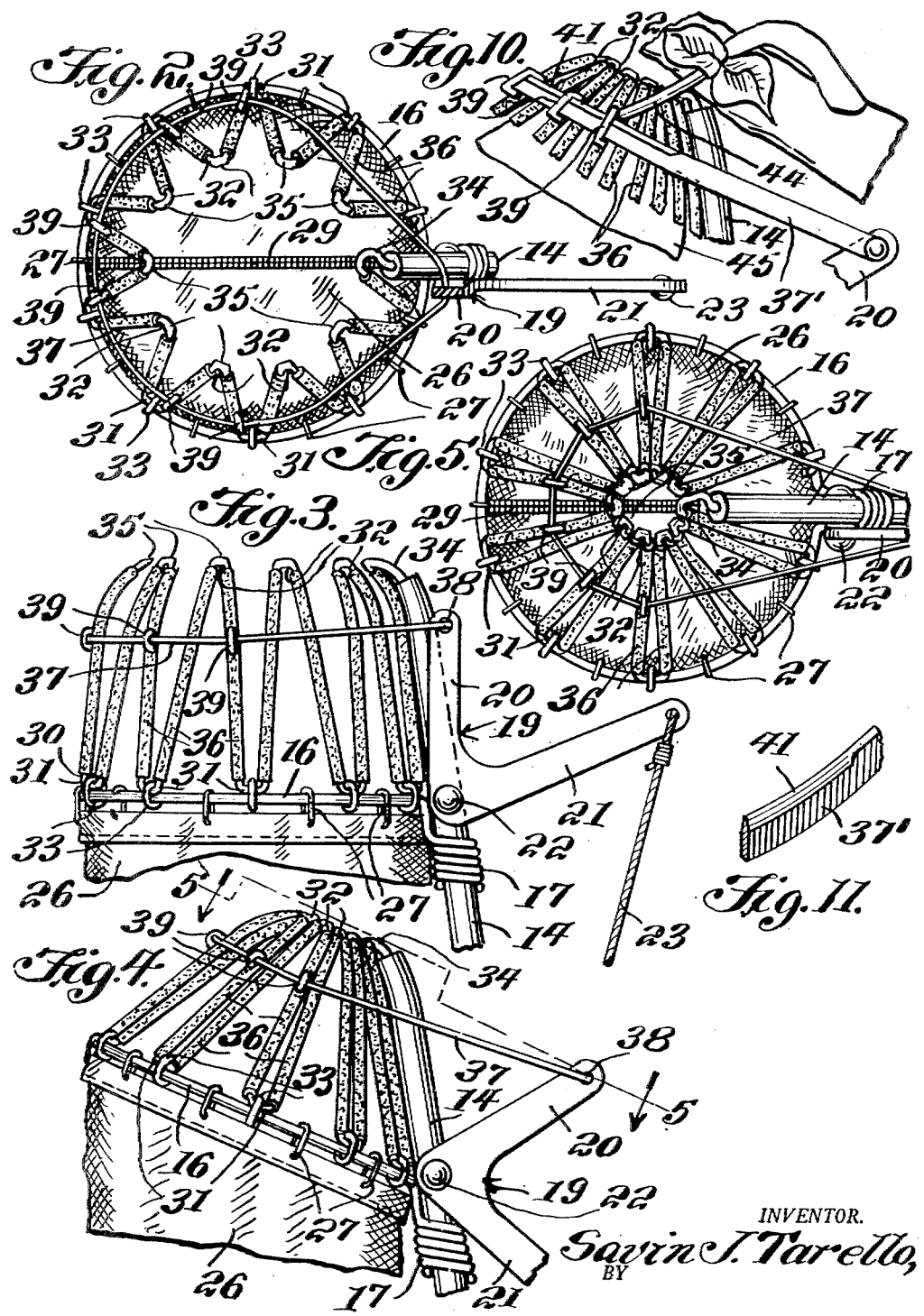

Savin J. Tarello, Santa Cruz, Calif.

Application September 8, 1954, Serial No. 454,793

4 Claims. (Cl. 56—335)

This invention relates to harvesting devices, and more particularly to an improved mechanical fruit picker.

The main object of the invention is to provide a novel and improved fruit picker which is simple in construction, which is easy to manipulate, and which enables the user to harvest fruit from otherwise inaccessible locations, such as on high branches of fruit trees, or the like.

A further object of the invention is to provide an improved mechanical fruit picker which is inexpensive to manufacture, which is rugged in construction, which is relatively light in weight, and which is provided with means for severing fruit from the supporting stems thereof without damage to the fruit, and for collecting the fruit, especially where the fruit is located out of normal reach or in a relatively inaccessible location on a tree.

Further objects and advantages of the invention will become apparent from the following description and claims, and from the accompanying drawings, wherein:

Figure 1 is a fragmentary side elevational view, with parts broken away and shown in cross section, of an improved fruit picker constructed in accordance with the present invention.

Figure 2 is an enlarged horizontal top plan view of the fruit picker shown in Figure 1.

Figure 3 is an enlarged fragmentary side elevational view of the upper portion of the fruit picker of Figures 1 and 2.

Figure 4 is a fragmentary elevational view, similar to Figure 3, but showing the fingers of the fruit picker device in contracted positions.

Figure 5 is a view taken on the line 5—5 of Figure 4.

Figure 6 is an enlarged elevational view with parts broken away and shown in section of a segment of the wire member 30.

Figure 7 is a cross sectional view taken on the line 7—7 of Figure 6.

Figure 8 is a cross sectional view taken on the line 8—8 of Figure 6.

Figure 9 is a side elevational view of a modified form of fruit picker according to the present invention.

Figure 10 is a fragmentary enlarged side elevational detail view of the upper portion of a still further modified form of fruit picker according to the present invention, showing the fingers of the fruit picker in contracted position.

Figure 11 is an enlarged fragmentary perspective view of the finger-encircling band element employed in the fruit picker of Figure 10.

Referring to the drawings, and more particularly to Figures 1 to 8, 11 designates a fruit picker which comprises an elongated handle or staff 12, said staff being composed of a pair of telescopic sections, said sections comprising the lower tubular section 13 and the upper rod-like section 14 which is telescopically engageable in the tubular section 13 and which may be clamped in extended position, as shown in Figure 1, by means of a set screw 15 provided in the upper portion of the lower section 13.

Rigidly secured to the upper portion of the rod-like section 14 is a ring member 16 of suitable, relatively stiff material, such as relatively stiff wire or the like which has one end portion thereof grippingly coiled around the upper portion of the member 14, as shown at 17, and which has its other end portion secured in any suitable manner to the coiled end portion 17 of the ring to define a closed rigid ring element.

As shown in Figure 1, the rod-like member 14 is bent slightly at 18 so that the upper portion of said rod-like member is offset laterally with respect to the lower portion thereof when the handle or staff 12 is vertically supported.

Designated at 19 is a bell crank lever having the inner arm 20 and the outer arm 21, said bell crank lever being pivoted at 22 to the upper portion of the rod 14. Secured to the end of the arm 21 is the flexible cable 23 which extends downwardly through respective eye members 24 and 25 secured to the rod 14 and to the hollow lower handle segment 13. As shown in Figure 1, the eye member 24 is preferably located adjacent the bend 18, so that the rod 14 may be telescoped for a substantial portion of its length into the hollow handle 13 when the staff 12 is collapsed.

Designated at 26 is a suitable receptacle or bag of flexible material, such as fabric or the like, said bag being secured at its top rim, as by the supporting rings 27 to the rigid ring member 16. The lower portion of the bag 26 is provided with a slide fastener 29, whereby said lower portion may be conveniently opened to discharge the contents thereof whenever desired.

Designated at 30 is a wire member which is bent at spaced portions therealong to define successive loops, said loops having the lower bight portions 31 and the upper bight portions 32. The lower bight portions 31 are pivotally secured to the ring member 16, as by the fastening rings 33.

As shown in Figure 2, one end of the wire member 30, designated at 34 is secured in the top end of the rod 14, thus rigidly anchoring said one end of the wire member 30 to the rod.

As is clearly shown in Figures 1, 2 and 3, the loops formed in the wire member are bent upwardly and inwardly to define fingers, the top bight portions 32 of the loops being sharpened to define cutting edges 35, as shown in Figure 8. The arms of the loops are covered with suitable resilient deformable sleeve material, such as rubber sleeve material 36, so that the fingers will not damage fruit gripped thereby when the fingers are contracted inwardly, as will be presently described.

Designated at 37 is a band member of resilient wire or the like, said band member being secured to the end of the arm 20 at 38, as shown in Figures 3 and 4. The band member 37 extends around the loops of the wire member 30, namely, around the intermediate portion of the upwardly and inwardly extending fingers defined by said loops, and is slidably received in apertured lugs 39, one apertured lug 39 being provided on alternate ones of the loops, as shown in Figure 3.

When the lever 19 is rotated from the position thereof shown in Figure 3 to the position thereof shown in Figure 4, namely, in a clockwise direction, as when the flexible cable 23 is pulled downwardly, the band member 37 cooperates with the wire loops to cause said loops to be contracted inwardly, namely, to bring the sharpened edges 35 at the top bight portions of the loops inwardly towards each other. Thus, when the fingers are engaged around a fruit and when the cable 23 is thereafter pulled, the fingers grippingly engage the fruit and the sharp edges 35 sever the stem connecting the fruit to its supporting branch. Thus, the fruit is detached and is dropped into the receptacle 26 when the cable 23 is thereafter released.

In the modified form of the invention shown in Figure 9, a flexible conduit member 26' is employed in place of the receptacle 26, said flexible conduit member being secured to the ring 16, as shown, and being provided with the elongated flexible spout portion 40 which extends downwardly and may be disposed in a suitable receptacle to receive the fruit after the fruit is detached from the tree, in the manner above described. The flexible conduit 40 serves to cushion the descent of the fruit and to cause said fruit to drop in a relatively slow fashion, whereby damage to the fruit is avoided.

In the form of the invention illustrated in Figures 10 and 11, a flexible metal band member 37' is employed in place of the wire band member 37 in the previously described forms of the invention, the metal band 37' being provided with the sharpened top cutting edge 41 which may be employed to sever stems of the tree supporting fruit, such as for example the stem 44 of the fruit 45 in Figure 10, instead of relying upon the sharpened edges 35 of the top loops of the fingers, as in the previously described forms of the invention. Thus, in the modification shown in Figures 10 and 11, the sharpened cutting edges 35 of the gripping fingers are omitted, and instead, the sharpened cutting edge 41 of the flexible band 37' may be relied upon for the cutting action. Thus, in using the device of Figures 10 and 11, the fruit 45 is first gripped by the fingers by exerting a pull on the cable 23, as in the previously described form of the invention, after which the device is manipulated to bring the cutting edge 41 against the stem to be severed and to sever said stem, allowing the fruit to be subsequently dropped into the receptacle of the device when the cable 23 is thereafter released.

While certain specific embodiments of an improved fruit picker have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fruit picker comprising a staff, a ring rigidly secured to the top end of said staff and projecting outwardly therefrom, a flexible receiving member secured to said ring, a plurality of upwardly extending fingers pivoted to said ring, a bell crank lever having an outer arm and an inner arm projecting from one end of the outer arm, said lever being at the one end of the outer arm pivoted to said staff adjacent said ring, cable means connected to the other end of the outer arm of said lever and arranged to rotate the lever, and means connecting the inner arm of said lever to said fingers and being arranged to rotate said fingers inwardly towards each other responsive to rotation of said lever.

2. A fruit picker comprising a staff, a ring rigidly secured to the top end of said staff and projecting outwardly therefrom, a flexible receiving member secured to said ring, a wire member secured at one end thereof to the top end of said staff, said wire member being bent at spaced portions therealong to define successive loops, each of said loops having a lower bight portion and an upper bight portion, means pivotally connecting the lower bight portions of the loops to said ring to define upwardly extending fingers extending from said lower bight portions, a bell crank lever having an outer arm and an inner arm projecting from one end of the outer arm, said lever being at the one end of the outer arm pivoted to said staff adjacent said ring, cable means connected to the other end of the outer arm of said lever and arranged to rotate the lever, and means connecting the inner arm of said lever to the intermediate portions of said loops and being arranged to rotate said fingers inwardly towards each other responsive to rotation of said lever.

3. A fruit picker comprising a staff, a ring rigidly secured to the top end of said staff and projecting outwardly therefrom, a flexible receiving member secured to said ring, an elongated member of relatively stiff material secured at one end thereof to the top end of said staff, said elongated member being bent at spaced portions therealong to define successive loops, each of said loops having a lower bight portion and an upper bight portion, means pivotally connecting the lower bight portions of the loops to said ring to define upwardly extending fingers extending from said lower bight portion, a bell crank lever having an outer arm and an inner arm projecting from one end of the outer arm, said lever being at the one end of the outer arm pivoted to said staff adjacent said ring, cable means connected to the other end of the outer arm of said lever and arranged to rotate the lever, and a flexible band member connected to the inner arm of said lever, said band member surrounding and being slidably connected to the intermediate portions of the respective loops.

4. A fruit picker comprising a staff, a ring rigidly secured to the top end of said staff and projecting outwardly therefrom, a flexible receiving member secured to said ring, a wire member secured at one end thereof to the top end of said staff, said wire member being bent at spaced portions therealong to define successive loops, each of said loops having a lower bight portion and an upper bight portion, means pivotally connecting the lower bight portions of the loops to said ring to define upwardly extending fingers extending from said lower bight portions, a lever pivoted to said staff, cable means connected to said lever and arranged to rotate the lever, and a flexible band member connected to said lever, said band member surrounding and being slidably conected to the intermediate portions of the respective loops, said band member being arranged to rotate said fingers inwardly towards each other responsive to rotation of said lever, said band member being formed with a sharpened top cutting edge.

References Cited in the file of this patent

UNITED STATES PATENTS

| Number | Name | Date |
|---|---|---|
| 54,527 | Gilliam | May 8, 1866 |
| 597,340 | Ward | Jan. 11, 1898 |
| 705,141 | Rauch | July 22, 1902 |
| 743,754 | Rohr | Nov. 10, 1903 |
| 771,842 | Stansbury et al. | Oct. 11, 1904 |
| 864,639 | Gier | Aug. 27, 1907 |
| 1,247,878 | Raney | Nov. 27, 1917 |
| 1,362,471 | Brockschmidt | Dec. 14, 1920 |